(12) United States Patent
Caronni et al.

(10) Patent No.: US 7,730,038 B1
(45) Date of Patent: Jun. 1, 2010

(54) EFFICIENT RESOURCE BALANCING THROUGH INDIRECTION

(75) Inventors: Germano Caronni, Menlo Park, CA (US); Raphael J. Rom, Palo Alto, CA (US); Glenn Carter Scott, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 503 days.

(21) Appl. No.: 11/055,272

(22) Filed: Feb. 10, 2005

(51) Int. Cl.
*G06F 17/30* (2006.01)

(52) U.S. Cl. .................................................. 707/688

(58) Field of Classification Search ........................ None
See application file for complete search history.

(56) References Cited

U.S. PATENT DOCUMENTS

| | | | |
|---|---|---|---|
| 6,263,350 B1* | 7/2001 | Wollrath et al. ............. | 707/206 |
| 6,360,262 B1* | 3/2002 | Guenthner et al. .......... | 709/226 |
| 6,826,580 B2* | 11/2004 | Harris et al. ................ | 707/202 |
| 6,839,815 B2* | 1/2005 | Kagami et al. .............. | 711/148 |
| 6,842,766 B2* | 1/2005 | Brockway et al. ........... | 709/203 |
| 7,136,903 B1* | 11/2006 | Phillips et al. .............. | 709/217 |
| 7,246,140 B2* | 7/2007 | Therrien et al. ............. | 707/202 |
| 2001/0029525 A1* | 10/2001 | Lahr ........................... | 709/218 |
| 2002/0010783 A1* | 1/2002 | Primak et al. ............... | 709/228 |
| 2002/0019879 A1* | 2/2002 | Jasen et al. .................. | 709/240 |
| 2002/0023156 A1* | 2/2002 | Chujo et al. ................. | 709/226 |
| 2002/0099843 A1* | 7/2002 | Fruchtman et al. .......... | 709/232 |
| 2002/0103907 A1* | 8/2002 | Petersen ...................... | 709/226 |
| 2002/0161850 A1* | 10/2002 | Ulrich et al. ................. | 709/214 |
| 2003/0084098 A1* | 5/2003 | Lavin et al. .................. | 709/203 |
| 2003/0174648 A1* | 9/2003 | Wang et al. .................. | 370/235 |
| 2004/0010593 A1* | 1/2004 | Apostolopoulos et al. ... | 709/226 |
| 2004/0103206 A1* | 5/2004 | Hsu et al. ..................... | 709/230 |
| 2006/0029076 A1* | 2/2006 | Namihira et al. ............ | 370/392 |

OTHER PUBLICATIONS

A. Adya, et al.; "Farsite: Federated, Available, and Reliable Storage for an Incompletely Trusted Environment"; Proceedings of the 5$^{th}$ Symposium on Operating Systems and Design Implementation OSDI; Dec. 2002 (14 pages).
I. Clarke, et al.; "Freenet: A Distributed Anonymous Information Storage and Retrieval System"; Lecture Notes in Computer Science; 2000 (21 pages).
J. Kubiatowicz, et al.; "OceanStore: An Architecture for Global-Scale Persistent Storage"; Proceedings of ACM ASPLOS; Nov. 2000 (12 pages).

(Continued)

*Primary Examiner*—Neveen Abel Jalil
*Assistant Examiner*—Bai D Vu
(74) *Attorney, Agent, or Firm*—Osha • Liang LLP

(57) ABSTRACT

A method for locating a resource involves maintaining a capacity object configured to store server information for a plurality of servers, transmitting a resource request from a client to an indirection server comprising the capacity object, selecting one of the plurality of servers to service the resource request using server associated with the capacity object to obtain a selected server, and redirecting the resource request from the indirection server to the selected server.

16 Claims, 4 Drawing Sheets

OTHER PUBLICATIONS

A. Rowstron, et al.; "Storage Management and Caching in PAST, a Large-Scale, Peristent Peer-to-Peer Storage Utility"; Symposium on Operating Systems Principles; Oct. 2001 (13 pages).

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the $5^{th}$ USENIX Symposium on Operating Systems Design and Implementation (OSDI '02); Dec. 2002 (23 pages).

F. Dabek, et al.; "Towards a Common API for Structured Peer-to-Peer Overlays"; Proceedings of $2^{nd}$ International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. $30^{th}$ Annual ACM Symposium on Theory of Computing (STOC); May 1998 (10 pages).

* cited by examiner

EFFICIENT RESOURCE BALANCING THROUGH INDIRECTION

BACKGROUND

Typical operating systems (e.g., windows-based systems by Microsoft, Sun Solaris™, Linux™, MacOS by Apple Computer, Unix, etc.) provide a resource manager. The resource manager shares the resources of a computer system with the applications requesting use of the resources. Typical resources that are managed by a resource manager include processors, disk space, memory, peripheral devices, etc. For example, if two applications request to use the printer, the resource manager determines which application uses the printer first by placing requests into a queue.

In a distributed system, computer systems may be located in multiple locations throughout a private or public network. The computer systems within a distributed system may be considered a client, a server, or act as a client and server in certain situations. The client is typically the computer system that requests a service or resource, while the server is a computer system that shares a resource or performs a service (hereinafter, the use of the term "resource" is intended to refer to resources or services). A distributed system is useful because the distributed system allows the load created from the client requests to be distributed among a number of servers, thereby increasing the throughput of the entire system by leveraging the underutilized resources in the distributed system.

The resources that a server provides may range from processor time to storage space. In a distributed system, a client may request a resource, and the request is serviced by one of the number of servers with the resource available. Further, using a distributed system allows several requests to be handled simultaneously. Allowing the load to be distributed among a plurality of servers may help reduce the load placed on an individual server (whether on the processor, storage system, etc.).

Several methods are currently used to provide the location of a server where the requested resource may be found. These methods include using directory services, broadcasting, and querying (e.g., unicast, multicast, etc.). The current methods may provide a one-to-one mapping of a client and a server that handles the request of the client. With this method, several servers may be available to satisfy requests, but individual clients are mapped directly to specific servers. Another method, for example, may send a request out to the network, where servers that are listening for requests respond.

As discussed above, the server may handle a client's request for a resource using a one-to-one mapping. For example, a client, Client X, may have an object, Object A, that needs to be stored. Client X may be mapped, using a one-to-one mapping, with Server Z. In this distributed system, Client X may send a request to Server Z to store Object A. Several possibilities may occur. Server Z may reply indicating that space is available and Object A may be stored on Server Z. Server Z may reply indicating that space is not available, and Object A cannot be stored on Server Z. Server Z may reply indicating that the Server Z is busy, and the request is handled later. Server Z may not reply. In this type of system, the server typically is prepared for the specific types of requests that a client may make, and has a large amount of resource available.

In a distributed system, a distributed hash table (DHT) may be used to store and locate data throughout the number of servers. No central server is required to locate the data, instead each server has a partial list that may be used to determine where the data is located in a short series of steps. DHT allows the use of a programming interface with services that may be used to store data, distribute data, etc. DHT provides an algorithm to locate data once the data is stored in one of the number of servers. DHT treats each server like a bucket in a hash table, and assigns the responsibility of data to a server using a hash function allowing easy lookup when the data is needed.

SUMMARY

In general, in one aspect, the invention relates to a method for locating a resource, comprising maintaining a capacity object configured to store server information for a plurality of servers, transmitting a resource request from a client to an indirection server comprising the capacity object, selecting one of the plurality of servers to service the resource request using server associated with the capacity object to obtain a selected server, and redirecting the resource request from the indirection server to the selected server.

In general, in one aspect, the invention relates to a system, comprising a client configured to send a resource request, a capacity object configured to store server information for a plurality of servers, an indirection server configured to accept the resource request from the client, wherein the indirection server comprises the capacity object, and a selected server selected from the plurality of servers using server information associated with the capacity object, wherein the resource request is redirected from the indirection server to the selected server.

In general, in one aspect, the invention relates to a computer readable medium comprising software instructions for locating a resource, wherein the software instructions comprise functionality to maintain a capacity object configured to store server information for a plurality of servers, transmit a resource request from a client to an indirection server comprising the capacity object, select one of the plurality of servers to service the resource request using server associated with the capacity object to obtain a selected server, and redirect the resource request from the indirection server to the selected server.

Other aspects and advantages of the invention will be apparent from the following description and the appended claims.

DETAILED DESCRIPTION

Figure 1:
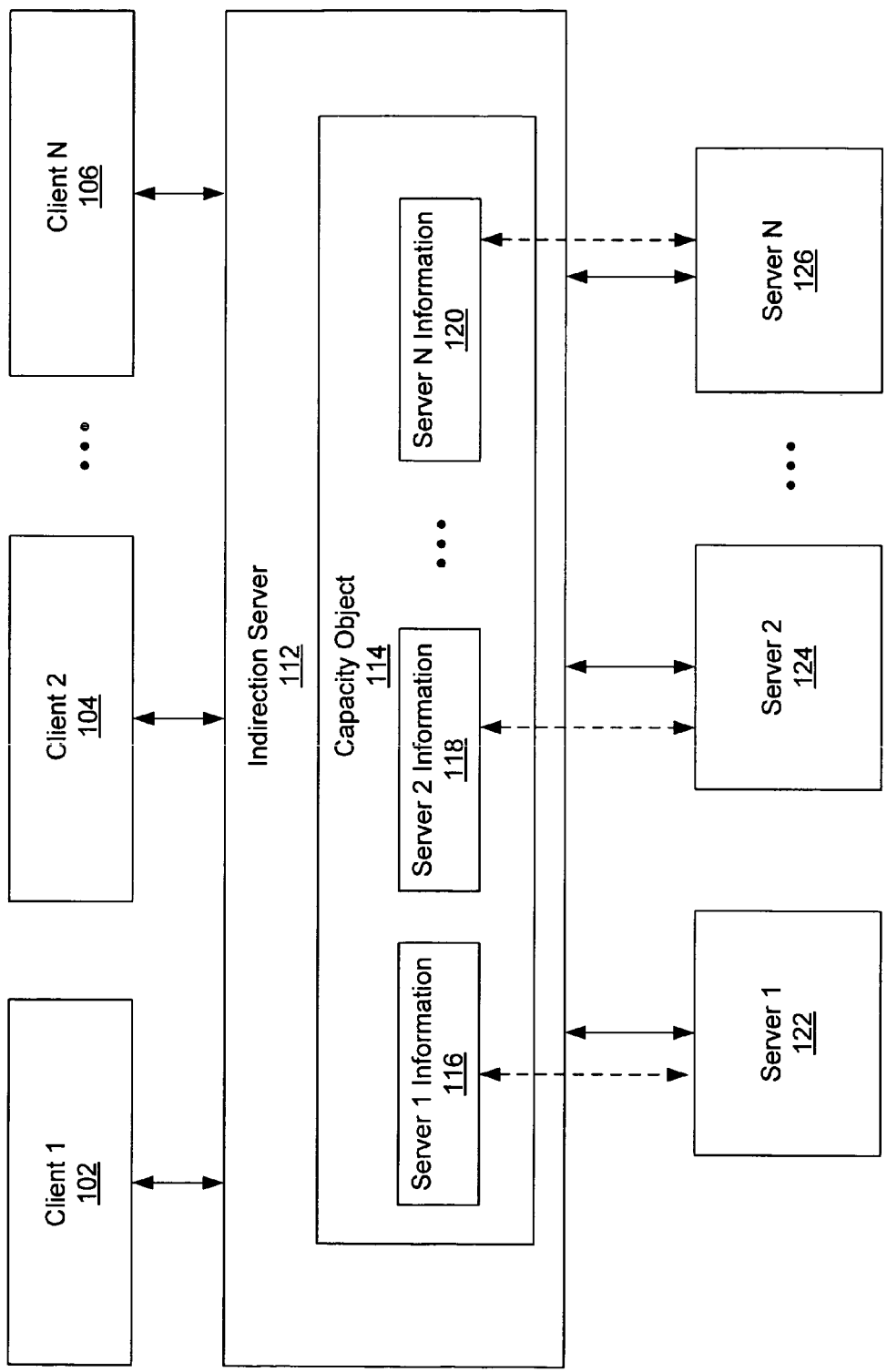
FIG. 1 shows the system for locating a resource, in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of this invention provide a system and a method for locating a resource by using indirection. Specifically, in one embodiment of the invention, a request is made for a resource by a client to an indirection server, and in response, the indirection server determines a server, from several servers, with the resource and redirects the request to that server. Accordingly, the server and the client establish a direct connection and the server services the request from the client.

The indirection server determines the server with the resource requested by the client by using data stored in a capacity object. In one embodiment of the invention, the capacity object stores server information (e.g., capacity, reliability, availability, bandwidth, etc.) for each of the servers. Specifically, the indirection server uses a pre-defined algorithm, which processes the data stored in the capacity object, to determine which server should receive the redirected request (i.e., the server that includes the resource requested by the client).

FIG. 1 shows the system for locating a free resource using indirection in accordance with one embodiment of the invention. The system includes several clients (e.g., Client 1 (102), Client 2 (104), Client N (106)), each of which may include an application executing on an operating system, in accordance with one embodiment of the invention. Specifically, in one embodiment of the invention, the client (or more specifically an application or operating system executing on the client) may request a resource (e.g., disk space, processor time, a printer, device drivers, libraries, software components, etc.) from a server (e.g., Server 1 (122), Server 2 (124), Server N (126)).

One skilled in the art will appreciate that while FIG. 1 depicts several clients, in one embodiment of the invention, only one client machine may be present. Further, one or more applications and operating systems may be located on the client machine. The application may be any user program or system program (e.g., a word processor, a spread sheet application, a garbage collector, etc.). The operating system may be any system that includes functionality to allocate resources, including memory, processor time, disk space, peripherals, device drivers, etc.

In one embodiment of the invention, the request from the client is initially sent to an Indirection Server (112), which, in turn, redirects the request to a server (e.g., Server 1 (122), Server 2 (124), Server N (126)) that includes the requested resource. The Indirection Server (112) is used to redirect the request from a requesting client to an appropriate server. A Capacity Object (114) is maintained within the Indirection Server (112), however, in accordance with another embodiment of the invention, the Capacity Object (114) could be maintained outside of the Indirection Server (112). In accordance with one embodiment of the invention, the Capacity Object (114) may be replicated on the Indirection Server (112), on another indirection server, or outside of the indirection servers, so that the Capacity Object (114) is highly available.

The Indirection Server (112) uses the server information (e.g., Server 1 Information (116), Server 2 Information (118), and Server N Information (120)) that is stored in a Capacity Object (114) when determining the server in which to redirect the request from the client. The server information (e.g., Server 1 Information (116), Server 2 Information (118), and Server N Information (120)) may include the storage capacity of a server, the bandwidth of a server, the reliability of a server, the number of processors available on the server, etc. In accordance with one embodiment of the invention, the server information may be stored as a field in a database in which server data may be inserted, updated, and retrieved.

Figure 2:
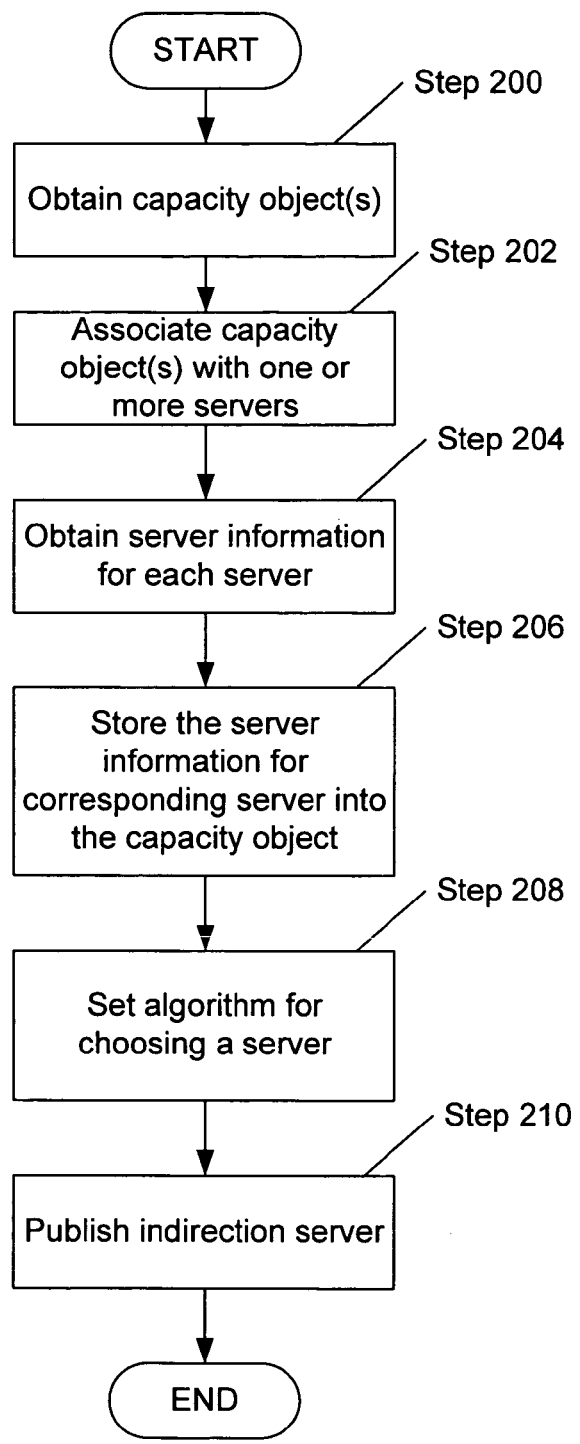
FIG. 2 shows a flow chart for initializing the system to locate a resource, in accordance with one embodiment of the invention.

FIG. 2 shows a flow diagram for initializing the system to locate an available resource, in accordance with one embodiment of the invention. Using a capacity object initially involves obtaining a capacity object (Step 200). In one embodiment of the invention, a capacity object may be obtained by requesting a capacity object from the Indirection Server (as shown in FIG. 1 and described above). In addition, more than one capacity object may be requested, allowing several capacity objects to maintain server information for distinct sets of servers. Also, each capacity object may be replicated, allowing the capacity object to remain highly available when a request is received by the Indirection Server.

After obtaining one or more capacity objects, each capacity object is associated with one or more servers (Step 202). Specifically, the server information for each server associated with a capacity object is maintained within that capacity object. In accordance with one embodiment of the invention, the capacity object is replicated and made highly available to the clients. Each capacity object may store the server information for a distinct set of servers, however, the sets may overlap. Once the set of servers associated with a capacity object is determined, the server information for each associated server is obtained (Step 204) and stored within the capacity object (Step 206). As discussed above, the server information may include the storage capacity of a server, the bandwidth of a server, the reliability of a server, the number of processors available on the server, etc.

As discussed above in FIG. 1, the Indirection Server (112) redirects the request from the client to a server with available resources. Specifically, the Indirection Server (112) uses the server information located within the Capacity Object (114) to determine which server to redirect the request. Returning to FIG. 2, the Indirection Server uses an algorithm to process the server information data and determine the server in which to redirect the request. The Indirection Server is initially set to the server determined using this algorithm (Step 208). For example, if the client is requesting space to store an object, in accordance with one embodiment of the invention, the algorithm used by the indirection server may be to find the first server that has enough storage capacity for the object. Optionally, the algorithm used by the indirection server may select the server that has enough storage capacity, and also has the best reliability. Once the capacity object is initialized and the algorithm is selected, the indirection server is published (Step 210), allowing the clients to see that the indirection server exists and allows the clients to send requests for resources to the published indirection server.

While the steps described in FIG. 2 occur in a specific order, it is not required that all of the steps follow the specified order. For example, the algorithm used to select the server to service the client's request may occur anywhere in the process. Accordingly, the invention shall not be limited to the ordering of the steps, as described in FIG. 2.

Figure 3:
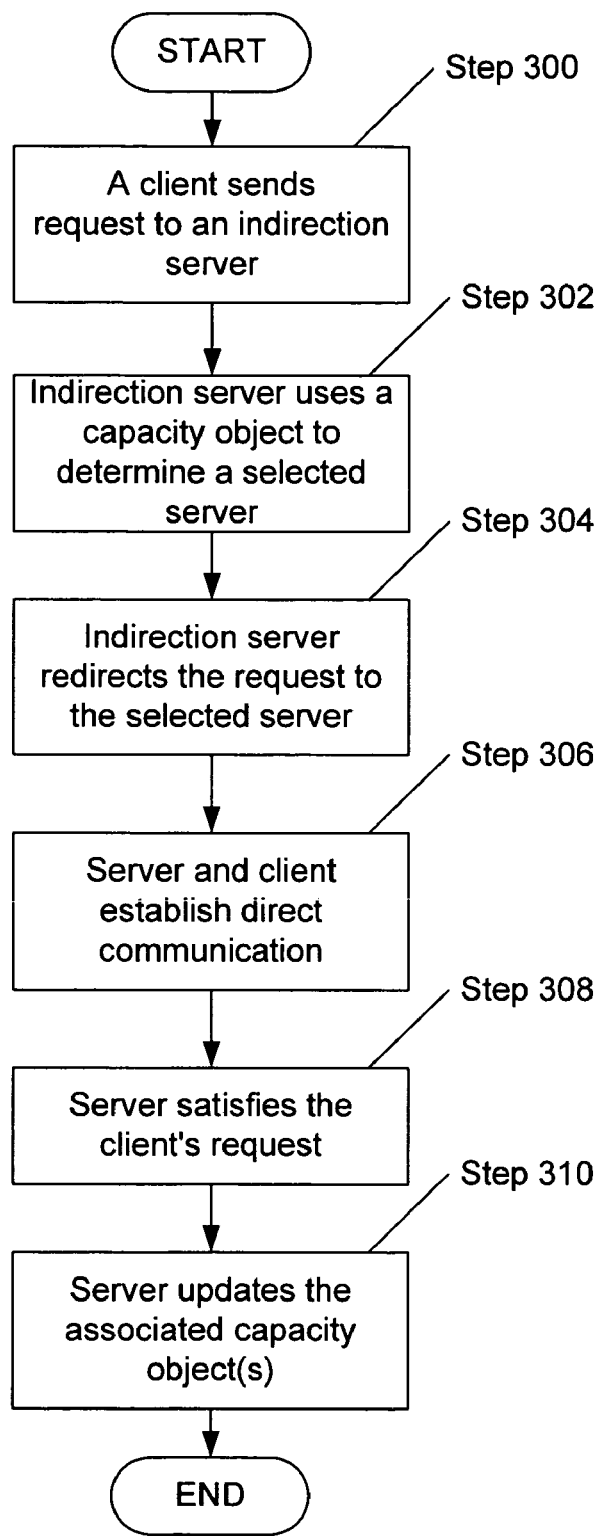
FIG. 3 shows a flow chart for locating a resource, in accordance with one embodiment of the invention.

FIG. 3 shows a flow chart for locating a resource using indirection, in accordance with one embodiment of the invention. Initially, a client sends a request for a resource to an indirection server (Step 300). For example, the application or operating system that is executing on a client may need a resource from a server; therefore, the request for the resource is sent.

The indirection server then processes the request from the client by executing a pre-defined algorithm on the server information stored in the capacity object to select one of the plurality of servers to service the request (Step 302). The server that is selected to service the request is the selected server. As discussed above in FIG. 2, several different predefined algorithms may be used by the indirection server to select the server to service the request. In one embodiment of the invention, as discussed in FIG. 2, one of the pre-defined algorithms is chosen. The pre-defined algorithm may select the selected server with a likelihood proportional to at least one field of the server information (e.g., storage capacity) for the selected server. For example, in one embodiment of the invention, the pre-defined algorithm used involves examining whether the probability of selecting a server is proportional to the storage capacity available on that server. Alternatively, several pre-defined algorithms may be set, and the algorithm that is used may be chosen based on server information or the resource requested.

Once the indirection server has selected the selected server, the client's request is redirected from the indirection server to the selected server (Step 306). In accordance with one embodiment of the invention, the selected server may verify that the resource is available. If the resource is not available, the request may be denied, and the client may generate a new request. If the resource is available, the selected server and the client that requested the resource establish a connection to communicate directly (Step 308). Once the selected server and the aforementioned client are in direct communication, the selected server is able to service the client's request. For example, if the client's request is to store an object, once the selected server and the client are in direct communication, the client may start sending the object to the selected server, and the selected server may begin storing the object.

Once a request has been serviced, or while the request is being serviced, the server information for the selected server may be affected. For example, if an object is stored on the selected server, then the storage capacity of the server is reduced, which, in turn, is reflected in the server information. If several pages are in the process of being printed (i.e., the printer is busy), the server has one less printer available, which again is reflected in the server information. This updated server information is maintained in the capacity object associated with that server (Step 310). In one embodiment of the invention, the selected server may send a message to the indirection server with updated server information, allowing the indirection server to update the capacity object. In one embodiment of the invention, the server information may be updated in the capacity object periodically. For example, the server information may be updated in the capacity object at a pre-defined interval, e.g. every 3 seconds, every 3 update events, etc.

For example, Client X sends a request to Indirection Server B to store Object A. Indirection Server B has a capacity object that contains the server information for Server M, Server N, and Server O. In this example, the server information only includes the storage capacity of each server. Specifically Server M has 100 MB available, Server N has 200 MB available, and Server O has 200 MB available. Indirection Server B selects the server to send Client X's request to store Object A by running the predetermined algorithm. In this example, Indirection Server B picks the server randomly with a probability proportional to the capacity available for that server. Server M has a 20% chance of being selected, while Server N and Server O both have a 40% chance of being selected. Indirection Server B chooses Server O to store Object B, and redirects the request made by Client X to Server O. Server O may then verify that Server O has enough space to Store Object A. If Server O does have enough space, Server O establishes direct communication with Client X. Once communication is established between Server O and Client X, Client X transfers Object A to Server O for storage. Assuming Object A is 10 MB, Server O sends an update to the capacity object, informing the capacity object that Server O now has 190 MB available. After a pre-defined interval of 3 seconds, the server information associated with that capacity object is updated.

If Server O does not have enough space, Server O may not establish a direct communication with Client X, and Client X may send another request to Indirection Server B to store Object A. In one embodiment of the invention, Indirection Server B again randomly chooses the server with a probability proportional to the capacity available for that server and the process continues as described above.

The above example is only one embodiment of the invention. Other algorithms may be used when choosing the server to service the request. For example, Indirection Server B may verify that a server has enough space before redirecting the request to that server.

Figure 4:
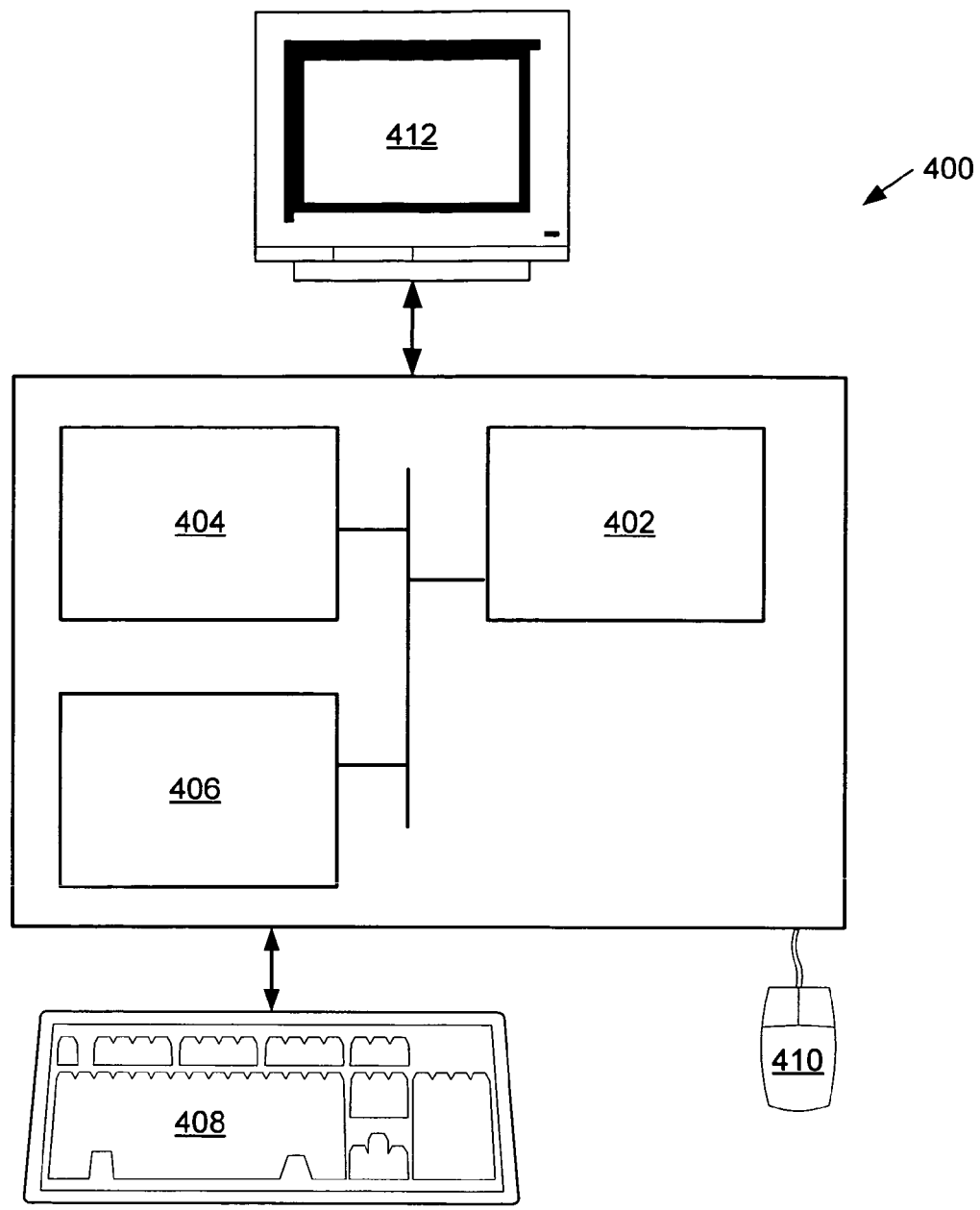
FIG. 4 shows a typical computer with components, in accordance with one embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer system (400) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for locating a resource, comprising:
   obtaining a first availability of the resource on a first server and a second availability of the resource on a second server;
   storing the first availability and the second availability in a capacity object;
   publishing the capacity object after storing the first availability and the second availability;
   after publishing the capacity object, receiving a request for the resource from a client;
   identifying the capacity object storing a first server information for the first server of the resource and a second server information for the second server of the resource, wherein the first server information comprises the first availability of the resource on the first server and a first bandwidth of the first server, and wherein the second server information comprises the second availability of the resource on the second server and a second bandwidth of the second server;
   replicating the capacity object on a first indirection server;

replicating the capacity object on a second indirection server;

selecting the first server in response to the request using a function, wherein selecting is based on the first server information and the second server information;

redirecting the request from the first indirection server to the first server, wherein the first server handles the request;

receiving a message from the first server, wherein the message is sent in response to handling the request by the first server, and wherein the message comprises an updated availability and an updated bandwidth for the first server; and updating the capacity object by:

reducing the first availability of the resource on the first server and the first bandwidth of the first server in the capacity object to generate an updated capacity object;

replicating the updated capacity object on the first indirection server; and replicating the updated capacity object on the second indirection server.

2. The method of claim 1, wherein the resource is storage space.

3. The method of claim 1, wherein the resource is processor time.

4. The method of claim 1, wherein the responding to the request comprises allocating at least a part of the resource to the client.

5. The method of claim 1, wherein the function is a probability function.

6. A system, comprising:
a client configured to send a request for a resource;
a first server comprising a first availability of the resource and a first bandwidth, the first server configured to:
  handle the request for the resource, and
  send a message in response to handling the request, wherein the message comprises an updated availability and an updated bandwidth for the first server;
a second server comprising a second availability of the resource and a second bandwidth; a capacity object configured to:
  store first server information comprising the first availability and the first bandwidth of the first server, and
  store second server information comprising the second availability and the second bandwidth of the second server; and
a first indirection server of the plurality of indirection servers for storing the capacity object and configured to:
  obtain the first availability and the second availability;
  store the first availability and the second availability in the capacity object;
  publish the capacity object after storing the first availability and the second availability;
  receive the request for the resource after publishing the capacity object;
  select the first server in response to the request using a function, wherein selecting is based on the first server information and the second server information,
  redirect the request from the first indirection server to the first server after the first server is selected by the first indirection server, wherein the first server handles the request,
  receive the message from the first server,
  update the capacity object based on the updated availability and the updated bandwidth to obtain an updated capacity object,
  replicate the updated capacity object on a second indirection server of the plurality of indirection servers, and
  replicate the updated capacity object on a third indirection server of the plurality of indirection servers.

7. The system of claim 6, wherein the indirection server is further configured to reduce the first availability based on consumption of the resource to service the request.

8. The system of claim 6, wherein the resource is storage space.

9. The system of claim 6, wherein the resource is processor time.

10. The system of claim 6, wherein the resource is a printer.

11. The system of claim 6, wherein the function is a probability function.

12. A computer readable medium storing software instructions for locating a resource, the software instructions executable on a processor and comprising functionality to:
obtain a first availability of the resource on a first server and a second availability of the resource on a second server;
store the first availability and the second availability in a capacity object;
publish the capacity object after storing the first availability and the second availability;
after publishing the capacity object, receive a request for the resource from a client;
identify the capacity object storing a first server information for the first server of the resource and a second server information for the second server of the resource, wherein the first server information comprises the first availability of the resource on the first server and a first bandwidth of the first server, and wherein second server information comprises the second availability of the resource on the second server and a second bandwidth of the second server;
replicate the capacity object on a first indirection server;
replicate the capacity object on a second indirection server;
select the first server in response to the request using a function, wherein selecting is based on the first server information and the second server information;
redirect the request from the first indirection server to the first server after the first server is selected by the indirection server, wherein the first server handles the request;
receive a message from the first server, wherein the message is sent in response to handling the request by the first server, and wherein the message comprises an updated availability and an updated bandwidth for the first server; and update the capacity object by:
  reducing the first availability of the resource on the first server and the first bandwidth of the first server in the capacity object to generate an updated capacity object;
  replicating the updated capacity object on the first indirection server; and
  replicating the updated capacity object on the second indirection server.

13. The computer readable medium of claim 12, wherein the resource is storage space.

14. The computer readable medium of claim 12, wherein the resource is processor time.

15. The computer readable medium of claim 12, wherein the resource is a printer.

16. The computer readable medium of claim 12, wherein the function is a probability function.

* * * * *